United States Patent [19]

Fitzsimmons et al.

[11] 4,112,580

[45] Sep. 12, 1978

[54] DEVICE FOR DETERMINING ANGLES

[75] Inventors: William A. Fitzsimmons, 1015 Edgehill Dr., Madison, V.I. 53701; James E. Lawler, Madison, Wis.

[73] Assignee: William A. Fitzsimmons, Madison, Wis.

[21] Appl. No.: 786,646

[22] Filed: Apr. 11, 1977

[51] Int. Cl.² ............................................. G01B 3/56
[52] U.S. Cl. ...................................................... 33/174 S
[58] Field of Search ........................................ 33/174 S

[56] References Cited

U.S. PATENT DOCUMENTS

| | | | |
|---|---|---|---|
| 2,056,948 | 10/1936 | Benson | 33/174 S |
| 2,511,443 | 6/1950 | McDowell | 33/174 S |
| 2,592,543 | 4/1952 | Dauber | 33/174 S |
| 2,645,026 | 7/1953 | Trbojevich | 33/174 S |
| 2,669,027 | 2/1954 | Wilson | 33/174 S |
| 3,085,345 | 4/1963 | Pearson | 33/174 S |
| 3,195,238 | 7/1965 | Grenell | 33/174 S |
| 3,214,841 | 11/1965 | Young | 33/174 S |
| 3,389,473 | 6/1968 | O'Connor | 33/174 S |

*Primary Examiner*—Richard E. Aegerter
*Assistant Examiner*—Willis Little
*Attorney, Agent, or Firm*—Harry C. Engstrom; Theodore J. Long; Nicholas J. Seay

[57] ABSTRACT

A device particularly suited for use in optics, having a planar sine plate mounted for rotation about a lateral axis, with the sine plate being capable of holding an optical device such as a diffraction grating. A pivot arm member is mounted for rotation about an axis perpendicular to the axis of rotation of the sine plate, and is in contact with the end of the plate over a portion of its rotational displacement. A calibrated drive such as a micrometer is mounted in position to make contact with the pivot arm near the end thereof, to drive the pivot arm inwardly and outwardly a determinable longitudinal distance. The distance that the pivot arm is driven by the micrometer is related to the angle of the plate as it rotates in contact with the pivot arm. Means are provided for minimizing frictional resistance at the contact between the pivot arm and the plate and between the pivot arm and the drive member of the micrometer.

9 Claims, 4 Drawing Figures

DEVICE FOR DETERMINING ANGLES

BACKGROUND OF THE INVENTION

1. Field of the Invention.

This invention pertains generally to so-called sine or tangent bar devices utilized for relating the angle of inclination of a measuring plane to the linear displacement of an end of the measuring plane, and more particularly to sine bar type devices suitable for use in optics.

2. Description of the Prior Art.

It is commonly desired in precision machining operations to precisely determine the angle of a machine part, and as a result a number of devices have been developed to allow the setting of such angles to a higher degree of precision than is attainable with common angle measuring devices such as protractors and the like. These devices, commonly known as sine bars, typically consist of a precision machined planar member which rests at one end upon a machined flat member, and is raised at the other end a precisely determined linear distance. The sine of the angle of inclination is directly related to the linear distance that the one end of the planar member is displaced. The displacement of the planar member, or sine bar, is typically accomplished by supporting the end of the planar member on precisely machined gage blocks or by a calibrated precision drive such as a micrometer.

Sine bar type devices also find application in optics wherein it may be desired to precisely set the angle of a mirror, lens, or diffraction grating relative to the direction of incoming light. A relatively recent development requiring precision angle setting is the use of "Echelle" gratings as optical filters in tunable narrow bandwidth lasers. The Echelle grating has the property of reflecting directly back towards a light source only a narrow band of light frequencies within the frequency of the light that is directed upon the grating. The midfrequency of the light that is reflected directly back to the light source is dependent upon the angle of incidence of the light which is directed upon the grating. Precise setting of the angle of the Echelle grating allows precisely selected frequencies to be directed back to the source of laser light, thereby allowing the laser to be tuned to the desired frequency by adjusting the angle of the grating. See, e.g., J. E. Lawler, W. A. Fitzsimmons, and L. W. Anderson, "Narrow Bandwidth Dye Laser Suitable for Pumping by a Short Pulse Duration $N_2$ Laser," *Applied Optics*, Vol. 15, p. 1083 et seq., April 1976. The precision setting of the angle of the Echelle grating is preferably accomplished by the use of a precision sine bar type device.

The typical adjustable sine bar is fixed at one end of the planar member and is driven upwardly by a spindle of a micrometer drive at the other end. Such a device is obviously limited in the angles to which the micrometer drive can displace the end of the sine plate. A straightforward response to this problem has been to mount the micrometer itself for sliding movement so that the micrometer can be moved inwardly toward the pivot point of the planar member as the planar member is moved upwardly toward very large angles. However, this requires precision adjustments both of the displacement of the spindle of the micrometer and the displacement of the micrometer inwardly toward the pivot point. These problems become especially acute in the use of sine bars for mounting Echelle gratings since it is desirable to be able to operate the Echelle grating over relatively large changes, in angles of incidence, from relatively small angles of incidence up to relatively large angles of incidence in the range of 70° to 80°, while maintaining a high degree of precision.

SUMMARY OF THE INVENTION

The device of our invention can be used to determine the angle of a sine bar or sine plate member over a relatively large range of angles with a high degree of precision, thereby allowing the application of such a device to positioning of an Echelle grating or other optical instruments. Our device utilizes a sine plate member mounted to a frame for free rotation about a lateral axis, and the Echelle grating may be mounted to this plate for rotation therewith. A pivot arm member is pivotally mounted to the frame to rotate about an axis which is substantially perpendicular to the axis about which the plate rotates, and a calibrated drive is mounted in position to have a drive member thereof rotate the pivot arm as the drive member moves longitudinally. In accordance with our invention, the pivot arm member is maintained in contact with the plate member over a portion of the rotational displacement thereof such that linear longitudinal displacements of the drive member rotating the pivot arm are related to the change in the angle of the plate member. This relationship is preferably a proportionality between the displacement of the drive member and the sine of the angle, but other trigonometric relationships, such as a tangent relationship, may also be utilized for some applications of our device.

The sine plate preferably has a longitudinally extending arm portion to which a laterally disposed roller bearing is rotatably mounted. The pivot arm is mounted to the frame in position to contact the roller bearing on the plate over a substantial range of angular displacements of the plate. To minimize the friction at the contact between the sine plate and the pivot arm, a cylindrical rod is preferably mounted to the pivot arm member and disposed parallel to the axis of mounting of the pivot arm member to the frame. The cylindrical rod is positioned to make rolling point contact with the roller bearing over a selected range of angular displacements of the sine plate.

The pivot arm has a portion thereof which extends laterally outward and which has a spherical abutment member mounted thereto near the end of the outward extension of the pivot arm. The calibrated linear drive means, such as a standard micrometer, is mounted to the frame in position such that the flat face of the drive member or spindle of the micrometer will make point contact with the spherical abutment member mounted on the pivot arm member. Rotation of the thimble of the micrometer drives the spindle thereof outwardly, to thereby rotate the pivot arm member outwardly. The sine plate is maintained in rolling contact with the pivot arm by a first spring mounted between the sine plate and the pivot arm member which resiliently urges the sine plate toward the pivot arm member. The micrometer spindle is maintained in contact with the spherical abutment by a second spring mounted between the pivot arm member and the frame which resiliently urges the pivot arm member toward the sine plate. Thus, the extending arm portion of the sine plate will rotate upwardly as the pivot arm member is rotated rearwardly by the spindle of the micrometer. Conversely, retraction of the spindle of the micrometer, in cooperation with the inwardly urging force of the springs, will move the pivot arm member inwardly and rotate the sine plate downwardly.

The sine of the angle of incidence of a horizontal column of light on a grating mounted in the plane of the sine plate will be equal to (a) the linear longitudinal displacement of the end of the extending arm of the sine plate from a vertical plane which passes through the axis of rotation of the sine plate, divided by (b) the distance along the plane of the sine plate from the axis of rotation of the sine plate to the end of the extending arm of the sine plate. The distance from the axis of rotation of the sine plate to its end is fixed. The roller bearing at the end of the sine plate will be in constant contact with the cylindrical rod of the pivot arm member, and as the pivot arm rotates, the longitudinal displacement of the cylindrical rod will be accompanied by an equal longitudinal displacement of the end of the extending arm of the sine plate. Moreover, the longitudinal distance that the cylindrical rod is displaced will preferably bear a fixed relationship to the longitudinal displacement of the spherical abutment member on the end of the pivot arm member. Thus, a linear displacement of the spindle of the micrometer, calibrated and measured by the micrometer, is directly proportional to the longitudinal displacement of the extending arm of the sine plate, which is itself directly proportional to the sine of the angle of the sine plate away from the vertical plane. This relationship may be maintained in our device up to angles of incidence in the range of 80°.

Further objects, features, and advantages of our invention will be apparent from the following detailed description taken in conjunction with the accompanying drawings showing a preferred embodiment of a device for determining angles exemplifying the principles of our invention.

DESCRIPTION OF THE PREFERRED EMBODIMENT

Figure 1:
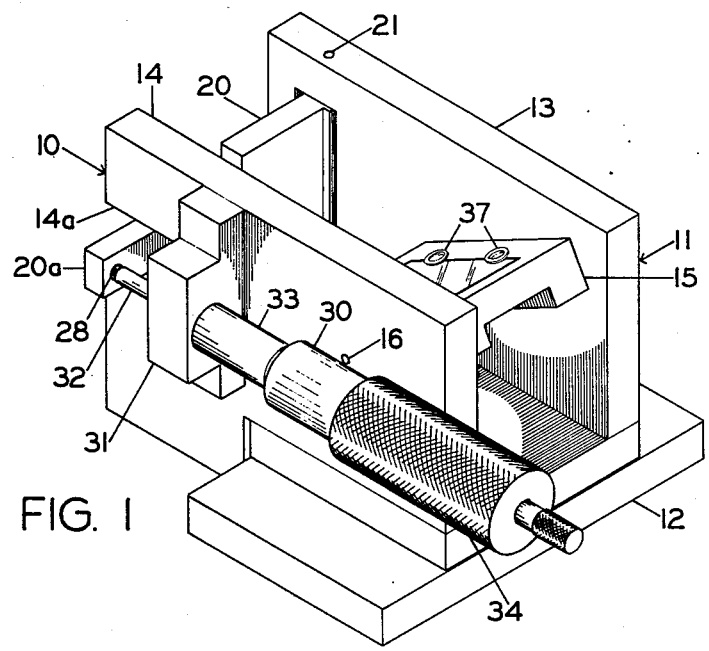
FIG. 1 is an isometric view of our device for determining angles.

Referring now more particularly to the drawings, wherein like numerals refer to like parts throughout the several views, a preferred embodiment of our device for determining angles is shown generally at 10 in FIG. 1. The device 10 includes a support frame 11 which supports the movable parts of the mechanism.

Figure 3:
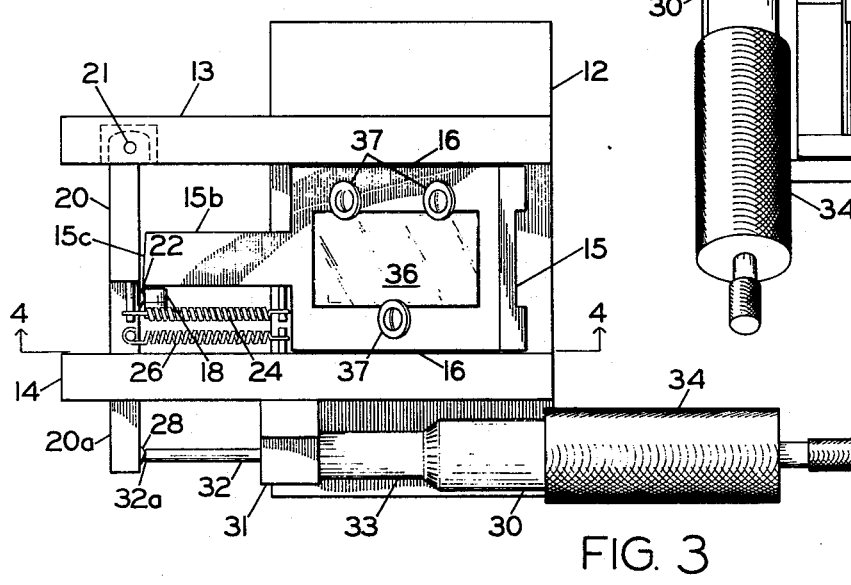
FIG. 3 is a top plan view of the device of FIG. 1.

The support frame 11 includes a base 12, which is preferably a block of metal with a flat bottom surface which will rest firmly on a horizontal supporting surface. The support frame 11 also has a pair of support members 13 and 14 fixedly mounted to the base 12 in a generally upright position in laterally spaced relationship to each other. As shown in FIG. 1, the base 12 may include a raised portion to which the support members 13 and 14 are rigidly attached along their bottom edges. The support members 13 and 14 may extend longitudinally beyond the base 12, as shown in FIGS. 1 and 3, to provide support for other parts of the device 10.

A sine plate member 15 is provided which is formed and shaped for mounting between the laterally spaced support members 13 and 14. The plate member 15 consists of a flat block portion 15a having a generally planar upper surface and an extension or arm 15b which extends longitudinally from the block 15a. The sine plate is mounted for rotation around a lateral axis by pivot bearings 16 which extend from the support members 13 and 14 to either side of the sine plate 15.

Figure 4:
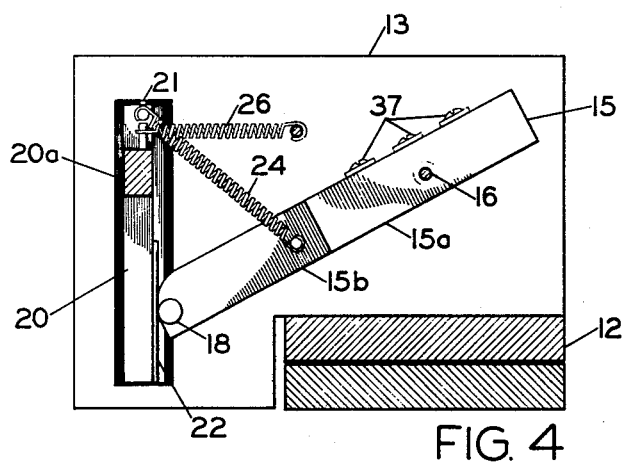
FIG. 4 is a cross-sectional view of the device of FIG. 1 taken along the line 4—4 of FIG. 3.
Figure 2:
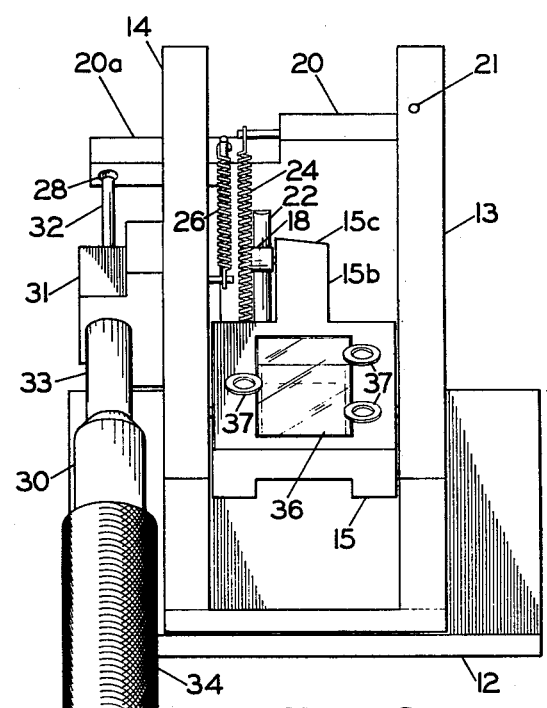
FIG. 2 is a view of the device of FIG. 1 looking from in front of and above the device.

A roller bearing 18 is rotatably mounted to the side of the extending arm 15b of the sine plate member at the extreme end of the arm. The roller bearing 18 is mounted to rotate along an axis parallel to the axis of rotation of the sine plate itself. A pivot arm member 20 is mounted as shown in FIGS. 3 and 4 by an axle 21 which is rotatably mounted to the support member 13. For the reasons explained below, the pivot arm member 20 is mounted for rotation about an axis which is perpendicular to the laterally extending axis of rotation of the sine plate. The pivot arm is preferably mounted in a position such that it can rotate in contact with the bearing 18 at the end of the extending arm of the sine plate over a substantial portion of a 90° range of rotational displacement of the sine plate. For purposes of illustration, the embodiment of our sine bar device shown in the drawings will allow contact between the pivot arm and the extending arm of the sine plate over a range of rotation of the sine plate from about 45° to about 80°. The terminal end 15c of the extending arm is beveled away from the roller bearing 18 as shown in the drawings to allow the sine plate to rotate upwardly and outwardly towards the pivot arm without engaging the pivot arm except at the roller bearing 18. To minimize the frictional contact between the roller bearing and the pivot arm 20, a cylindrical rod 22 is mounted to the pivot arm member in position to make point contact with the roller bearing 18. The cylindrical rod 22 is disposed in its mounting in the pivot arm to lie generally parallel to the axis of rotation of the pivot arm. Thus, as the sine plate 15 rotates upwardly and downwardly, the roller bearing 18 will remain in point contact with the rod 22, albeit at different points along the rod.

A first spring 24 is mounted between the sine plate 15 and the pivot arm member 20 to resiliently bias or urge the sine plate and the pivot arm member towards each other and maintain them in contact over the desired portion of the rotational displacement of the sine plate. A second spring 26 is mounted between the support frame 11 and the pivot arm 20 to resiliently urge and bias the pivot arm to rotate inwardly toward the sine plate and the frame. The springs 24 and 26 will thus always maintain the roller bearing 18 in rolling contact with the cylindrical rod 22 as the pivot arm 20 is independently rotated inwardly or outwardly.

The pivot arm member 20 has an extending portion 20a which entends laterally outwardly through a slot 14a in the support member 14. An abutment member 28 is mounted to the pivot arm member near the outward end thereof and is preferably formed to have an exposed portion extending outward from the pivot arm 20 which is in the shape of a portion of a sphere. The cylindrical rod 22 and the spherical abutment 28 are both preferably mounted to the pivot arm 20 such that the geometric axis of the rod 22 and the center of the abutment 28 will be in a plane that contains the axis of rotation of the pivot arm 20.

A calibrated micrometer drive 30 is supported by a rigid mounting bracket 31 to the support wall 14. The micrometer drive 30 is mounted such that the linearly movable drive member or spindle 32 of the micrometer will come into contact with the spherical abutment 28. The contact face 32a of the spindle is preferably formed flat so that only substantially point contact is made between the face of the spindle and the abutment. The micrometer 30 is preferably of a standard size having a stationary calibrated barrel 33 held by the bracket 31 and a rotatable thimble portion 34 which may be rotated by an operator. Rotation of the thimble 34 causes the spindle 32 to move either outwardly toward the pivot arm 20 or inwardly away therefrom, depending upon the direction of rotation of the thimble. The spindle 32 moves inwardly and outwardly along a line which is preferably substantially perpendicular to both the axis of rotation of the sine plate 15 and the axis of rotation of the pivot arm 20. The actual distance that the face 32a of the thimble 32 is advanced or retracted may be read off the calibrated barrel of the micrometer 30, which is marked with indicia as is customary in such linear micrometers. Any other drive mechanism which could move a drive member inwardly and outwardly a determinable distance with precision, could be utilized in place of the standard micrometer mechanism 30.

From the foregoing, it will be apparent that rotation of the thimble 34 of the micrometer 30 will drive the spindle 32 outwardly, thereby rotating the pivot arm 20 outwardly, and concurrently allowing the sine plate 15 to rotate upwardly. Conversely, rotation of the thimble 34 to drive the spindle 32 inwardly will result in rotation of the pivot arm 20 inwardly because of the inward urging of the spring 26, and the sine plate 15 will rotate downwardly. When our device 10 is utilized to carry an Echelle grating, the sine plate 15 is preferably formed with a central opening in the block portion 15a thereof into which an Echelle grating 36 may be inserted. The grating is secured by means of the attachment screws 37, as best shown in FIG. 3. The grating 36 is preferably mounted such that the face of the grating is substantially parallel to the planar upper surface of the sine plate. In such a case, the angle of incidence of a horizontal column of light on the grating will be substantially equal to the angle of intersection of the planar surface of the sine plate with a vertical plane where our device is resting on a horizontal surface.

The principles of operation of our device are best illustrated with respect to the top view of FIG. 3. As indicated above, the center of the cylindrical rod 22 and of the spherical abutment 28 preferably lie in a plane which contains the axis of rotation of the pivot arm member 20. Thus, the point of contact of the face 32a of the spindle 32 with the spherical abutment 28 will be maintained a fixed distance from the point of contact of the roller bearing 28 with the cylindrical rod 22, such that displacement of the spindle 32 in a longitudinal direction will be accompanied by corresponding longitudinal displacements of the point of contact of the roller bearing 18 and the cylindrical rod 22. Moreover, the ratio of the two longitudinal displacements will remain fixed, and the fixed ratio between the two displacements will be equal to the ratio of (a) the distance of the centerpoint of the spherical abutment 28 to the center of the pivotal mounting 21 of the pivot arm 20, to (b) the distance of the centerpoint of the cylindrical rod 22 from the centerpoint of the pivotal mounting 21 or axis of rotation of the pivot arm 20. This fixed relationship between the displacement of the drive spindle 32 and the longitudinal displacement of the end of the sine plate will be maintained over the selected range of rotation of the plate member, even though the end of the extending arm of the plate and the roller bearing 18 are moving up and down in elevational movement while they are moving in and out in longitudinal movement. The distance that the drive member or spindle 32 is moved may be read off the micrometer 30, and this distance reading will be directly related to the sine of the angle of the plate member from the vertical where the device is resting on a horizontal surface. More generally, the displacement of the drive member will be directly proportional to the change in the sine of the angle at which the plane of the planar surface of the plate member intersects an imaginary plane which is parallel to the axes of rotation of the plate member and the pivot arm member.

The novel provisions of our device for point contact between the plate member 15 and the pivot arm member 20 and corresponding point contact between the face of the spindle 32 and the spherical abutment 28, with these point contacts being maintained in fixed relationship with regard to their respective distances from the center of the pivotal mounting, allows for a precise setting of the angle of the plate 15 over a relatively large range of angles. For example, the embodiment of the sine bar device shown in the drawings, with particular reference to FIG. 4, allows precision setting of the angle of the sine plate by adjustment of the linear micrometer 30 over a range of angles from approximately a 45° angle of incidence to approximately an 80° angle of incidence. It is apparent that lower limits on the angle of incidence of the sine plate 15 can be obtained with simple modifications of the embodiment of our device shown in the drawings. For example, the distance from the lateral axis of rotation of the sine plate 15 to the point of contact of the sine plate with the pivot arm 20 may be shortened, with a resulting greater angular displacement of the sine plate for a given angular displacement of the pivot arm 20.

It is apparent that modifications of the mechanical structure of the embodiment described above may be accomplished without departing from the essential scope of our invention. While frictional contact forces experienced at the points where the pivot arm 20 contacts the spindle drive member 32 and the sine plate 15 are preferably minimized, these frictional forces may be held to tolerable levels by utilizing properly designed non-rolling contacts. For example, the pivot arm 20 may be provided with a flat and highly polished inner face. The end of the sine plate 15, at the end of the extending arm portion 15b, may be formed in a rounded extending point, which will ride smoothly on the polished face of the pivot arm. Similarly, the end of the spindle drive member 32 may be formed in a rounded point to ride with minimal friction on the polished face of the pivot arm. Lubrication of the face of the pivot arm may be utilized to minimize the frictional forces involved. It can be seen that such an arrangement would still maintain the essential fixed relationship between the longitudinal displacement of the end of the spindle drive member 32, and the longitudinal displacement of the end of the sine plate 15 in contact with the pivot arm 20. Such contact could be further modified by utilizing a lubricated ball member, similar to the tip of a ball point pen, as the point of contact between the sine plate 15 and the pivot arm face, and as the contact between the spindle drive member 32 and the face of the pivot arm. Such contacts also allow the fixed relationship to be maintained between the displacement of the spindle drive member 32 and the longitudinal displacement of the contact end of the sine plate 15.

It is understood that our invention is not confined to the particular construction and arrangement of parts herein illustrated and described, but embraces all such modified forms thereof as come within the scope of the following claims.

We claim:
1. A device for determining angles, comprising:
   (a) a support frame;
   (b) a plate member having a planar surface;
   (c) means for pivotally mounting said plate member to said frame for rotation of said plate member about a laterally extending axis of rotation;
   (d) a pivot arm member;
   (e) means for pivotally mounting said pivot arm member to said frame for rotation thereof about an axis of rotation which is perpendicular to the axis of rotation of said plate member, said pivot arm member being mounted in position to be engageable with said plate member over a selected portion of the rotational displacement of said plate member;
   (f) drive means, mounted to said frame and including a drive member, for driving said drive member back and forth in a longitudinal direction perpendicular to the axis of rotation of said plate member and the axis of rotation of said pivot arm member, said drive means being mounted to said frame in position to have the drive member thereof engage said pivot arm member to rotate the same; and
   (g) means for maintaining said pivot arm member in low friction rolling contact with said plate member over a portion of the rotational displacement of said plate member such that a linear longitudinal displacement of said drive member in contact with said pivot arm member results in a related change in the angle at which the plane of the planar surface of said plate member intersects a plane which is parallel to the axes of rotation of said plate member and said pivot arm member.

2. The device of claim 1 wherein a linear longitudinal displacement of said drive member is substantially directly proportional to the change in the sine of said angle of intersection.

3. The device of claim 1 wherein said pivot arm member has an elongated cylindrical rod mounted thereto and disposed in a direction parallel to the axis of rotation of said pivot arm member, and wherein said plate member has a roller bearing mounted in position to rollingly engage said cylindrical rod, whereby low friction minimal area contact between said pivot arm member and said plate member is maintained over a selected range of rotational displacement of said plate member.

4. The device of claim 1 wherein said means for maintaining said pivot arm member in contact with said plate member includes a spring attached in tension between said pivot arm member and said plate member in position to resiliently bias said plate member and said pivot arm member into contact with each other, and wherein said device also includes a spring attached in tension between said frame and said pivot arm member in position to resiliently bias said pivot arm member to rotate inwardly towards said plate member.

5. The device of claim 1 including a spherical abutment mounted to said pivot arm member in position to be contacted by the end of said drive member, and wherein the contact face of said drive member is formed flat, whereby minimal surface contact between said drive member and said pivot arm member is maintained over a portion of the range of rotational displacement of said plate member.

6. The device of claim 5 wherein said pivot arm member has an elongated cylindrical rod mounted thereto and diposed in a direction parallel to the axis of rotation of said pivot arm member such that the center of said cylindrical rod and the center of said spherical abutment lie substantially in a plane which contains the axis of rotation of said pivot arm member, and wherein said plate member has a roller bearing mounted in position to rollingly engage said cylindrical rod, whereby displacements of said drive member are substantially directly proportional to the change in the sine of the angle at which the plane of the planar surface of said plate member intersects a plane which is parallel to the axes of rotation of said plate member and said pivot arm member.

7. The device of claim 1 wherein said frame includes a base adapted to rest upon a horizontal surface and a pair of support members which are mounted to said base in laterally spaced relation, and wherein said plate member is pivotally attached to and between said support members for rotation about a laterally extending axis of rotation.

8. The device of claim 1 wherein said drive means comprises a hand operable micrometer having a linearly movable spindle drive member, whereby linear displacement measurements read on said micrometer may be related to the angle at which said plate member is disposed.

9. The device of claim 1 including an Echelle diffraction grating mounted to said plate member.

* * * * *